United States Patent
Gopalan et al.

(10) Patent No.: US 10,066,351 B2
(45) Date of Patent: Sep. 4, 2018

(54) METHOD AND FLUIDIC APPARATUS FOR GENERATING PULSED AND OSCILLATING AIR FLOW FOR SURFACE CLEANING AND SWEEPING

(71) Applicant: DLHBOWLES, Inc., Canton, OH (US)

(72) Inventors: Shridhar Gopalan, Westminster, MD (US); Dharapuram N Srinath, Elliot City, MD (US); Christopher South, Washington, DC (US)

(73) Assignee: DLHBOWLES, INC., Canton, OH (US)

( * ) Notice: Subject to any disclaimer, the term of this patent is extended or adjusted under 35 U.S.C. 154(b) by 0 days.

(21) Appl. No.: 15/687,162

(22) Filed: Aug. 25, 2017

(65) Prior Publication Data
US 2017/0350081 A1 Dec. 7, 2017

Related U.S. Application Data

(62) Division of application No. 14/244,441, filed on Apr. 3, 2014, now Pat. No. 9,765,491.

(Continued)

(51) Int. Cl.
*E01H 1/08* (2006.01)
*B05B 1/00* (2006.01)
(Continued)

(52) U.S. Cl.
CPC .......... *E01H 1/0809* (2013.01); *A01G 20/43* (2018.02); *B05B 1/005* (2013.01); *B05B 1/08* (2013.01)

(58) Field of Classification Search
CPC .......... B05B 1/005; B05B 1/08; B05B 12/06; E01H 1/0809; Y10T 137/2185
See application file for complete search history.

(56) References Cited

U.S. PATENT DOCUMENTS

| | | | |
|---|---|---|---|
| 3,745,906 A * | 7/1973 | Kakei | B60H 1/345 137/835 |
| 3,832,939 A | 9/1974 | Kakei et al. | |

(Continued)

FOREIGN PATENT DOCUMENTS

EP      0208174      1/1987

OTHER PUBLICATIONS

International Searching Authority, U.S. Patent Office, International Search Report and Written Opinion for International App. No. PCT/US2014/032849 dated Aug. 25, 2014.

(Continued)

*Primary Examiner* — Ryan A Reis
(74) *Attorney, Agent, or Firm* — McDonald Hopkins LLC

(57) ABSTRACT

An oscillating or pulsing fluid stream, or flow 18, 132, 300, is produced from a flow of pressurized air by fluidic apparatus 10, 100, 130, 180, 220 in a device 250 configured for use in surface cleaning, sweeping, lawn care applications, and the like. Converging inlet chamber walls 20, 22, define a tapered internal lumen having a smooth narrowing profile is configured to generate at a power nozzle 44 a high velocity stream with minimal pressure drop. Downstream of the power nozzle, first and second control ports CP1, CP2 are in fluid communication with the high velocity stream 46 and with each other via an inertance loop 72 having a lumen of selected cross sectional area and length. The varying air flow is directed through an outlet chamber 14, 134 shaped to produce an oscillating flow 18 or a pulsating flow 132.

4 Claims, 5 Drawing Sheets

Related U.S. Application Data

(60) Provisional application No. 61/807,958, filed on Apr. 3, 2013.

(51) Int. Cl.
    *B05B 1/08* (2006.01)
    *A01G 20/43* (2018.01)

(56) References Cited

U.S. PATENT DOCUMENTS

| | | | |
|---|---|---|---|
| 4,250,799 A | | 2/1981 | Stuoffer |
| 4,393,898 A | | 7/1983 | Izumi et al. |
| 4,407,186 A | | 10/1983 | Izumi et al. |
| 4,416,192 A | | 11/1983 | Izumi et al. |
| 4,644,854 A | * | 2/1987 | Stouffer .................. B05B 1/08 454/125 |
| 4,694,992 A | | 9/1987 | Stouffer |
| 4,709,622 A | * | 12/1987 | Stouffer .................. B05B 1/08 454/125 |
| 4,823,682 A | * | 4/1989 | Stouffer .................. B60H 1/242 237/12.3 A |
| 5,333,787 A | | 8/1994 | Smith |
| 6,575,386 B1 | * | 6/2003 | Thurber, Jr. ......... A61H 33/027 239/418 |
| 6,767,331 B2 | | 7/2004 | Stuoffer et al. |
| 6,904,626 B1 | * | 6/2005 | Hester .................. A61H 33/027 239/428.5 |
| 6,960,128 B2 | * | 11/2005 | Honda ...................... B08B 5/02 454/187 |
| 7,185,393 B2 | | 3/2007 | Dahlberg et al. |
| 7,472,847 B2 | * | 1/2009 | Mukai .................... B05B 1/005 137/811 |
| 7,766,261 B1 | * | 8/2010 | Santamarina ...... A61H 33/6063 239/589.1 |
| 2002/0040942 A1 | | 4/2002 | Srinath et al. |

OTHER PUBLICATIONS

European Patent Office, Extended European Search Report for Application 17154575, dated Sep. 27, 2017.

* cited by examiner

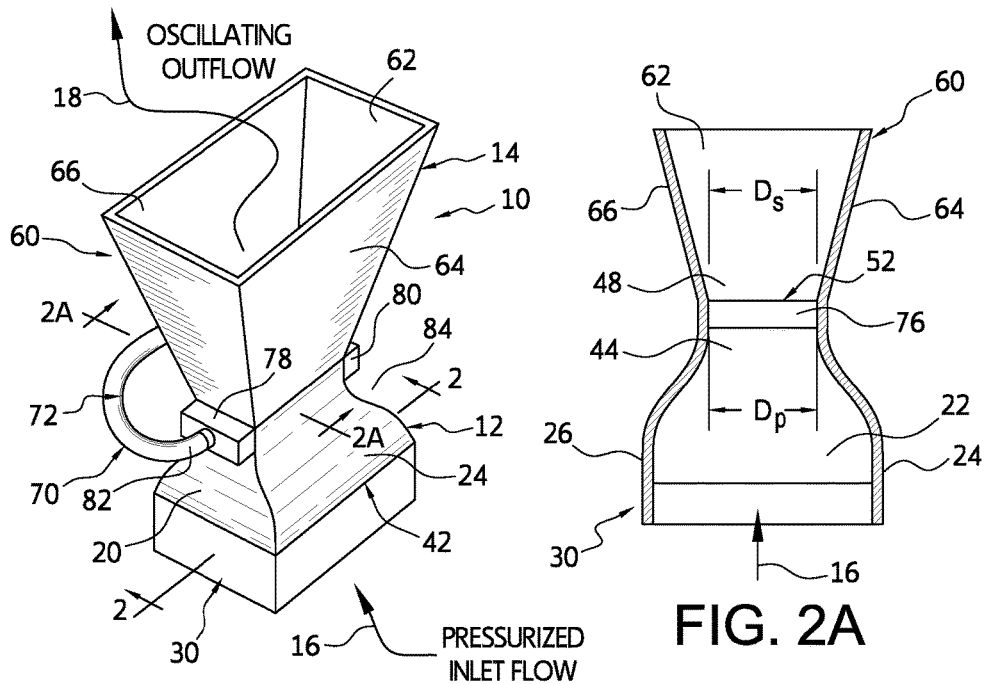
FIG. 1
FIG. 2A
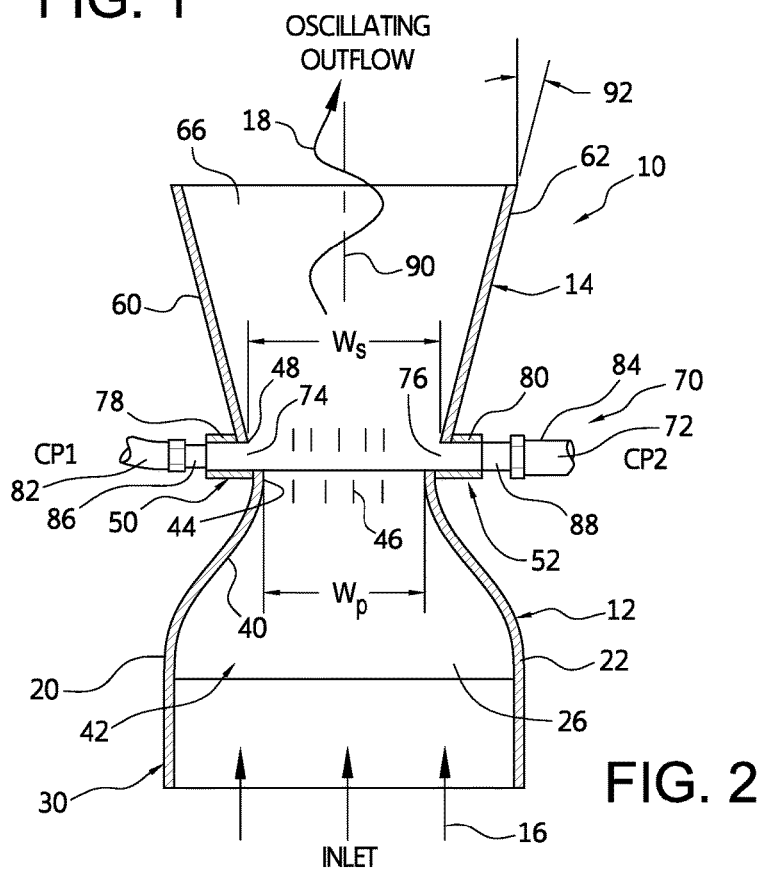
FIG. 2

METHOD AND FLUIDIC APPARATUS FOR GENERATING PULSED AND OSCILLATING AIR FLOW FOR SURFACE CLEANING AND SWEEPING

CROSS REFERENCE TO RELATED APPLICATIONS

This application is a divisional of U.S. patent application Ser. No. 14/244,441 filed 3 Apr. 2014, which claims the benefit of U.S. Provisional Application No. 61/807,958, filed on 3 Apr. 2013, entitled, "Fluidic apparatus & method for leaf blower, hair drier, oscillatory breathing and paint spraying applications", the entire disclosure of which are hereby incorporated by reference. This application is also related to commonly owned U.S. Non-Provisional application Ser. No. 13/107,848, filed 13 May 2011, entitled, "Fluid Stream Powered Pulse Generating Fluidic Oscillator", and commonly owned U.S. Pat. No. 4,644,854, issued 24 Feb. 1987, entitled "Air Sweep Defroster", the entire disclosures of which are incorporated herein by reference.

TECHNICAL FIELD

The present invention relates, in general, to methods for generating pulsed and oscillating air flows for use in lawn sweeping or other lawn care applications, for leaf blowing, for surface drying, cleaning or sweeping, and for other applications where such air flows can be beneficially used, and for apparatus for producing or directing such air flows.

BACKGROUND

Pneumatic pumps and electric pumps can be controlled to generate periodic pulses of pressurized liquid or gas. Prior art systems for doing this typically require control circuits which periodically energize pumps or which control switching valves to generate a desired sequence of pressurized pulses. The complicated systems of the prior art are expensive to make and maintain.

Pressurized air flows are used in innumerable applications; two very limited and distinctive examples include cans of compressed air that can be used to clean dust from surfaces, and fans that are used to provide a concentrated and pressurized air flow for lawn equipment such as leaf blowers. In the example of a leaf blower, it is well known that in the use of conventional equipment such as hand-held rakes or motor driven sweepers, obstacles such as cars parked in parking spaces make it necessary to leave parts of the area uncleaned, whereas, if the same area is cleaned with a leaf blower is it possible to blow away the rubbish underneath the parked cars, thereby increasing the efficiency, save time and improve the result. U.S. Pat. No. 7,185,393 illustrates one configuration of a leaf blower that typically includes at least a fan assembly to generate a substantially continuous flow of pressurized air of constant velocity and a tubular duct or nozzle which concentrates the flow so it can be manipulated or aimed by the operator to direct the air flow toward the surface to be cleaned of debris. Users often move the leaf blower laterally in a sweeping motion to move debris from a surface to be cleaned, but moving the leaf blower's duct or nozzle in that lateral, sweeping motion causes operator fatigue. Similarly, in the example of a compressed air container (e.g., as packaged in the Dust Off™ product) users must move the entire compressed air source to produce a sweeping motion to achieve the desired results.

To eliminate the need to move the entire source of the air flow in order to get a sweeping motion of pressurized air for use in cleaning surfaces, sweeping jet fluidic oscillators have been developed for a variety of uses. The use of such oscillators for defrosting and defogging operations on automobile windshields, for example, is disclosed in Kakei et al. U.S. Pat. Nos. 3,832,939 and 3,745,906, in Stouffer U.S. Pat. No. 4,250,799 (and divisions thereof), and in Stouffer et al, U.S. Pat. No. 4,644,854. In Kakei et al., several forms of sweeping jet oscillators for defrost purposes are disclosed, one of which includes a fluidic oscillator in which a pair of crossed feedback pipes receives portions of air issuing from an outlet downstream of an oscillator throat portion and returns the air to a pair of control ports. In the Stouffer '799 patent, a vibrating reed oscillator is utilized which significantly reduces the amount of space required, but in this device the movement of a weighted end of the vibrating reed through the jet or air stream creates a swishing sound noticeable to passengers in the close confines of an automobile.

In Stouffer et al, U.S. Pat. No. 4,644,854, the volumetric space occupied by a fluidic oscillator for the defrost system in an automobile is reduced by making the fluidic oscillator relatively short. This oscillator is of the type having a power nozzle, a pair of control ports immediately adjacent to and downstream of the power nozzle, and a continuous inertance loop interconnecting the control ports. Flow straighteners are preferably utilized just at the manifolding of the oscillator to the automobile duct work to thereby reduce the length of ducting to the power nozzle and thereby assure a more uniform and symmetrical velocity profile of the air stream entering the power nozzle. Fluid inertance is a measure of the pressure required to accelerate a mass of fluid in a passageway and thus is associated with flow through a tube or passage and is a function of the length and cross-sectional area thereof. Since the fluidic oscillator utilized is more sensitive to the inertance loop's cross-sectional area than to its length, that is, the fluidic flow is sensitive to abrupt changes in cross-section, particularly sudden reductions in the cross-sectional area of the continuous inertance loop, an important feature of that invention is the avoidance of abrupt changes in direction or cross-sectional area of fluid flow in the continuous inertance loop.

The use of electromagnets to regulate control port valving for air flow switching purposes in a power nozzle has been suggested for use in cars but this invites unnecessary complexity and requires a fluid logic element of at least 5W in length, where W is the width of the power nozzle, to get adequate sweeping angles. Fluidic oscillators based on a continuous passage or loop interconnecting the pair of control ports of the fluidic element are known in the art, as disclosed in Van Nostrand's Scientific Encyclopedia (6th Edition) page 1235, for example. In addition, Izumi et al. U.S. Pat. Nos. 4,416,192, 4,407,186 and 4,393,898 disclose use of fluidics with electromagnetic control in directional control of air in automobiles.

U.S. Pat. No. 6,767,331, which discloses a massaging apparatus and thus is only of background interest to the present invention, illustrates an inflatable bladder connected to a structure incorporating a fluidic switch for generating a time-varying bladder inflation flow of fluid, where the pressure is "recovered" from the bladder in a fluidic circuit having an output port that is open to the atmosphere as well as to a vent. The '331 patent does not describe a way of delivering a continuously pulsed supply of a fluid to an output, but, nevertheless, is incorporated herein in its entirety by reference.

Although the above-described prior art illustrates that the production of oscillating fluid flow in relatively small systems is known, there is a need for an economical, inexpensive and reliable system and method for generating an oscillating or a pulsed flow of pressurized gas which is applicable to large and robust equipment such as lawn and cleaning equipment, to overcome the problems of the prior art.

SUMMARY

In accordance with the apparatus and methods of the present invention, as exemplified in the illustrated embodiments thereof, novel fluidic devices are described which achieve improved performance in selected applications, including embodiments for use with equipment having compressed air sources such as may be found in products utilizing fans or blowers. In accordance with a preferred form of the invention, such equipment may include appliances or tools such as leaf blowers and the like.

Briefly, in accordance with the invention pulsing variable fluid stream, or flow, is produced from a flow of pressurized air by fluidic apparatus in a device configured for use in surface cleaning, sweeping, lawn care applications, and the like. A converging nozzle assembly defining a tapered internal lumen having a smooth sinusoidal profile is configured to generate at a power nozzle a high velocity stream with minimal pressure drop. Downstream of the power nozzle, first and second control ports are in fluid communication with the high velocity stream and with each other via an inertance loop of selected cross sectional area and length. A setback region downstream of the control ports cooperates with the inertance loop to cause a periodic variation in the downstream air flow, and the difference between the widths of the power nozzle and the setback and the length and diameter of the inertance loop cooperate to determine the frequency of the periodic variation. The varying air flow is directed through an outlet chamber shaped to produce an oscillating or a pulsating flow. In its simplest form the inertance loop can be a piece of hose linking the control ports.

More particularly, a gaseous fluid oscillation or pulse generating fluidic apparatus in accordance with preferred forms of the invention consists of an attachment, or nozzle assembly, which is a three-segment fluidic structure having an inlet segment, a power nozzle segment and an outlet segment all having lumens which are in fluid communication with one another and aligned on a central axis. This attachment is connectable to a source of pressurized fluid and provides a variable fluid exhaust, or outlet flow that oscillates or pulses, in accordance with relative dimensions of components of the attachment.

The inlet segment of the nozzle assembly, or attachment, has a large proximal inlet aperture for receiving fluid under pressure and an internal sinusoidal lumen that tapers inwardly downstream, in the direction of air flow, to a throat which terminates distally in a smaller power nozzle aperture defined within the power nozzle segment, with the aperture having a selected power nozzle width. The power nozzle segment has a diverging internal lumen area extending downstream from the power nozzle aperture, and terminating distally in a second, larger lumen area defined by a setback region having a width which is greater than the width of the power nozzle aperture and which defines the beginning of the outlet segment. The power nozzle segment also has first and second control ports CP1 and CP2, on opposed sides of the power nozzle segment and located downstream of the power nozzle aperture. The first and second control ports CP1 and CP2 are each in fluid communication with the power nozzle lumen and are aligned with each other on opposite sides of the central axis within the power nozzle lumen. The control ports CP1 and CP2 are linked to each other through a tubular lumen or duct known as the inertance loop.

The outlet segment has walls that may be configured to converge (for pulsing flow) or diverge (for oscillating or sweeping flow) from the setback region, and the outlet segment walls terminate distally in an exhaust aperture. The converging or diverging wall angles of the outlet segment are selected to be in the range of −15 degrees (converging) to 60 degrees (diverging) and cooperate with the relative dimensions of the power nozzle aperture and the setback width, and with the diameter and length of the inertance loop to control the exhaust flow characteristics. An oscillating mode of operation is available when the setback width is 1.1 to 1.5 times the power nozzle width, with a diverging outlet wall angle of 15 to 60 degrees, while a pulsating mode of operation is available when the setback width is 1.6 to 2.2 times the power nozzle width with a converging outlet wall angle of 0° to −15°. The length or diameter of the inertance loop providing fluid communication between the first and second control ports CP1 and CP2 can be adjusted to determine the frequency of variation for the exhaust gaseous fluid flow emitted from the open distal end of the outlet segment.

In accordance with the method of the present invention, fluid (e.g., air) flow (e.g., from a blower, pump or compressor) enters a fluidic device, which preferably is in the form of a nozzle assembly, or attachment for desired equipment, which is attachable at the nozzle assembly's inlet end for producing a controlled, varying, high pressure exhaust flow pattern at the nozzle assembly's outlet end. This nozzle assembly outlet end may be generally rectangular in cross-section with diverging or converging side walls, depending on the outlet flow pattern that is to be produced by the fluidic device. The invention includes configuring the nozzle assembly in an oscillating embodiment, or mode, or in a pulsating embodiment, or mode, and each configuration may incorporate a mechanism allowing it to be switchable between either of these modes and a "normal" or straight and steady flow configuration, or mode.

Configuring the invention in its oscillating mode includes providing the fluidic nozzle of the present invention with an inlet portion with converging (for example, 0 to 15 degrees) inlet sidewalls and an outlet portion with diverging outlet sidewalls (diverging at 15 to 60 deg.). The inlet sidewalls form an internal lumen with a narrowing or tapered, smooth, sinusoidal profile having a narrow power nozzle segment with a power nozzle aperture that is defined by the smallest cross-sectional area within the lumen. The method further includes providing, at a location adjacent but downstream of the power nozzle aperture, opposed first and second control ports (CP1 and CP2) in fluid communication with the air passing through the lumen and with one another by way of an inertance loop. In its simplest form the inertance loop can be an external piece of hose linking ports CP1 and CP2. The method also includes forming a setback region immediately downstream of the control ports, which leads to the outlet lumen defined by the outlet sidewalls. Supplying inlet air under pressure to the inlet end of the fluidic nozzle generates a high velocity outlet stream with minimal pressure drop, with the inertance loop causing the outlet stream to vary periodically in accordance with the configuration of the structure.

In the oscillating outlet flow embodiment of the invention, the outlet air flowing through the nozzle outlet lumen oscillates or sweeps back and forth between opposed outlet segment sidewalls. The sweeping effect is caused by the air flowing through the nozzle alternately attaching to and then releasing from opposite sidewalls of the nozzle. This alternating wall attachment and detachment effect (or oscillation) is produced by flows through the control ports CP1 and CP2, which are positioned and configured in the lumen near the region described as a setback region, by the relative widths of the power nozzle aperture and the setback, and by the length and diameter of the inertance loop which interconnects the ports. As noted above, the setback region is downstream of the control ports and of the power nozzle, and has a width that is wider than that of the power nozzle. The width of the setback region is selected to cooperate with the configuration of the inertance loop that links control ports CP1 and CP2 to determine the frequency of the oscillations.

The flowing stream of air exiting the power nozzle has a high pressure central portion which is referred to as the "main high pressure flow" and this passes continuously through the nozzle assembly from inlet to outlet during operation. The flowing air, while passing downstream or distally, expands into the setback segment and tends to attach to a side wall due to the wall attachment effect known as the "Coanda" effect. The expanding air flowing past the control port proximate the wall to which the main high pressure flow attaches itself produces a low pressure region which, by reason of the Venturi effect at the port, tends to draw fluid from the inertance loop into the setback segment proximate that control port which is then closest to the momentarily attached flow. This produces an "attachment bubble" proximate the opposing control port where air is drawn through, resulting in detachment of the main high pressure flow from it's momentarily attached outlet segment wall and causing that main high pressure flow to move laterally and then attach to the opposing wall. This fluidic oscillation process is inherently unstable or bistable, so once the air flow is detached from one outlet wall the process causes the air bubble to switch to the opposite wall, shifting the lateral position of the main high pressure flow. This process periodically repeats itself to produce a periodic or bistable oscillating shift in the direction of flow out of the nozzle assembly, with the frequency of this oscillation being controlled by the resistance within (i.e., the length and diameter of) the inertance loop connecting control ports CP1 and CP2 and the relative widths of the power nozzle aperture and setback.

When the fluidic apparatus of the present invention is configured to operate in a pulsating mode, the geometry of the sidewalls and the setback width are quite different from that of the oscillating mode, as described above. Whereas in the oscillating mode the setback width is 1.1-1.5 times the power nozzle width, in the pulsating mode the setback width is 1.6-2.2 times the power nozzle width. Furthermore, in the pulsating configuration the outlet sidewalls are parallel or preferably slightly converging, at 0 to −15 degrees, as opposed to the configuration for the oscillating mode where the walls are diverging at 15 to 60 degrees. As described above, in the oscillating mode, the stream attaches to a sidewall with a large "attachment bubble". This also occurs in the pulsating mode, but the converging or parallel outlet walls redirect the flow into to produce a straight pulsating jet (no sweep) with a pulse (or variation) frequency determined by the setback width, the length and diameter of the inertance loop, and the length of the sidewalls.

Both the oscillating and the pulsating embodiments of the present invention may incorporate a mode switch to enable the user to switch the nozzle apparatus from an oscillating mode (generating the oscillatory (sweeping) motion or the pulsing motion) to a non-oscillating mode (generating a straight steady stream) and vice versa. This mode selection is enabled in each case by a user-controllable valve or aperture in the inertance loop that can be selectively closed (to form a closed loop) or opened to the atmosphere. When open to atmosphere, fluid flowing through the nozzle apparatus simply entrains atmospheric air through both of the control ports, and this produces no wall detachment of the pressurized air flow through the device, resulting in a straight, non-pulsating jet. Either embodiment may be built with or without this switch mode.

An exemplary application for the apparatus and method of the present invention is as an attachment for a conventional leaf blower. In this application, a varying outlet flow, which can be either an oscillatory (sweeping) motion or a pulsating flow of outlet air, is provided. In each case, a switch mode permits "normal" operation; i.e. a straight steady stream, as described above. The frequency of the air flow variation preferably will be between 5 and 50 Hz. There are many advantages for the oscillatory motion of the outlet air flow, including clearing a wider region with minimal hand effort on the part of the user. Similarly, pulsator, or pulsating outlet flow has advantages in that it offers increased "punch" to clear debris.

Applicant has constructed prototypes for both the sweeping and the pulsator embodiments of the leaf blower. Typical dimensions for the oscillator embodiment were: power nozzle width=31 mm and height=41 mm; setback width=37.2 mm and height=41 mm, flow rate=approx. 265 cfm; and exit wall divergence angle=38 degrees. The control ports had widths of 9.5 mm, and the inertance loop consisted of tubing having an inner diameter of 15.9 mm and a length of 1.15 meters. Typical dimensions for the pulsator embodiment were: power nozzle width=31 mm and height=41 mm; setback width=62 mm and height=41 mm, exit wall convergence of −10 degrees, control port widths of 9.5 mm, and inertance loop tubing having an inner diameter of 9.5 mm and a length of 0.39 meter.

In summary, then, the present invention relates to a fluidic device, assembly or apparatus, for generating a variable periodic flow of pressurized air from a supplied steady stream of pressurized air (e.g., a blower or compressed air source). The device incorporates a nozzle assembly having an inlet with an internal lumen configured to receive an inlet air flow and defining a smooth tapered, narrowing or sinusoidal profile to a narrow power nozzle aperture configured to generate a high velocity air stream with minimal pressure drop. First and second control ports are in fluid communication with the internal lumen, downstream of the power nozzle segment, and an inertance duct or loop of selected cross sectional area and length interconnects and provides fluid communication between the first and second control ports. The device further includes a setback region downstream of the control ports, which defines a setback width greater than the width of the power nozzle aperture. The length and cross sectional area of the inertance loop and the relative widths of the setback and the power nozzle aperture determine the frequency of the periodic flow produced by the apparatus.

The above and still further objects, features and advantages of the present invention will become apparent upon consideration of the following detailed description of specific embodiments thereof, particularly when taken in con-

BRIEF DESCRIPTION OF THE DRAWINGS

FIG. 1 is a perspective view illustrating a first embodiment of the fluidic apparatus and method of the present invention wherein an oscillating output air flow is produced.

FIG. 2 is a cross-sectional view of the device of FIG. 1 taken along line 2-2 and FIG. 2A is a cross-sectional view taken along lines 2A-2A.

FIG. 6 is a perspective view illustrating a second version of the embodiment of FIG. 4, in accordance with the present invention.

DETAILED DESCRIPTION

Figure 3:
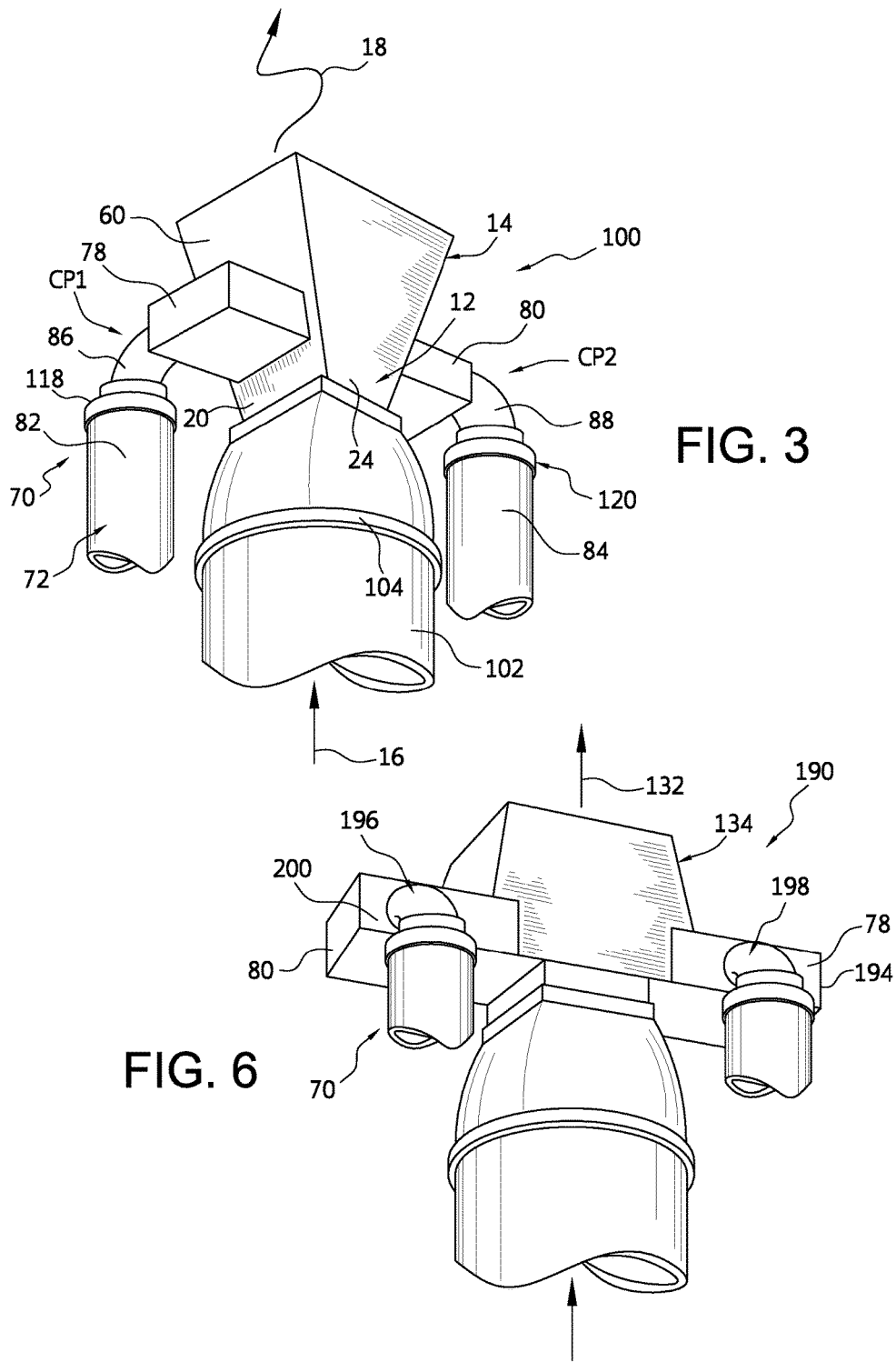
FIG. 3 is a perspective view illustrating a second version of the embodiment of FIG. 1, in accordance with the present invention.

Turning now to a more detailed description of the present invention, FIGS. 1, 2 and 2A illustrate at 10 a first embodiment of a fluidic device having a three-segment assembly defining a lumen and including an inlet segment, or chamber 12 and an outlet segment, or chamber 14. The inlet chamber of the fluidic device receives an inlet air flow 16 from a source (not shown) of fluid under pressure and produces from the outlet chamber a varying outlet flow 18. This varying flow is achieved in a device having no moving parts and no external power supply, but where the varying flow is produced by its fluidic geometry solely from energy in the inlet fluid stream 16.

Fluidic device 10 may be configured to work with both water and air, or in general with both liquids and gases, but will be described herein as air or gas flow device for convenience and clarity. Also, for clarity of explanation, the device of the invention will be described in terms of a preferred application as an attachment to a pressurized air flow source providing substantially straight and steady inlet air flow, such as a conventional leaf blower, although it will be understood that other sources of air (or other gasses) under pressure may also be used to provide the described inlet air flow.

In the embodiment illustrated in FIGS. 1, 2 and 2A, the varying outlet flow 18 is a laterally sweeping or oscillating flow, wherein the outlet air flow shifts periodically between opposite sides of the outlet chamber 14 to provide a sweeping motion of the outlet air flow. As illustrated, both the inlet chamber 12 and the outlet chamber 14 may be generally rectangular in cross-section, as viewed from the direction of the inflowing air 16, although other (e.g., circular, oval, ellipsoidal, hour-glass, elongated polygonal) cross sectional shapes (not shown) suitable for attaching the device 10 to different sources of air may be provided. In the illustrated embodiment, the inlet chamber is formed with opposed sidewalls 20 and 22 and with front and rear walls 24 and 26, and has a lower flange region 30 for use in connecting the inlet chamber to an air source such as a blower, pump, compressor, or the like, as by way of a suitable hose, connector fitting, or other conduit. In a preferred form of the invention, the air source is a conventional leaf blower having a forwardly-extending nozzle to which the fluidic device of the invention is attached.

The walls of the inlet chamber are shaped to form a converging nozzle, with the inner surfaces 40 of the walls having a smooth tapered, narrowing or sinusoidal profile, as best seen in FIGS. 2 and 2A, extending from the inlet or entry 42 upwardly and inwardly to a power nozzle segment having a power nozzle aperture 44, which has the smallest cross-sectional area within this converging nozzle, and which has a width WP (best seen in FIG. 2). This converging profile results in a high velocity stream of air 46, with minimal pressure drop. Downstream of the region of the power nozzle aperture 44, in the direction of air flow 46, the walls of the inlet chamber widen or diverge so that the cross-sectional area of the power nozzle segment of the fluidic device 10 expands to form a setback region 48 having an aperture with an area, or a width WS as viewed in FIG. 2, that is greater than the area, or width WP, of the power nozzle aperture 44.

The nozzle assembly lumen's cross sectional area is smaller at the power nozzle than at the setback, to expand the air flow path as illustrated in FIG. 2. Put another way the width of the lumen at the power nozzle WP is smaller than the width at the setback WS. The outlet chamber 14 incorporates opposed side walls 60 and 62, front wall 64, and rear wall 66. These are a continuation of the walls of the setback region to enclose and guide the outlet air flow 18. In the oscillating air flow embodiment of FIGS. 1, 2 and 2A, the side walls 60 and 62 of the outlet chamber 14 diverge from each other, as do the front and back walls 64 and 66; however, it should be understood that the front and rear walls 64 and 66 may be essentially parallel to each other, since it is the side walls and adjacent control ports that are effective in producing the variable flow of the invention. As illustrated in FIG. 2A, the depth of the power nozzle 44, indicated at Dp, and the depth Ds of the setback 48 may be equal to each other in the oscillating embodiment.

First and second control ports 50 and 52, also referred to as control ports CP1 and CP2, are located in the opposed side walls 20 and 22 of the inlet chamber, above (downstream of) but adjacent to the power nozzle 44 and below the setback region 48. The control ports CP1 and CP2 are in fluid communication with one another and so are linked through a tube or loop, known as the inertance loop, defining a continuous lumen which is generally indicated at 70. In its simplest form, the inertance loop 70 can be an external piece of hose 72 such as curled or flexible tubing or the like, linking CP1 and CP2. As illustrated, the control ports 50 and 52 may consist of apertures 74 and 76, respectively, in their respective side walls 20 and 22, having laterally projecting or outstanding control chambers or boxes 78 and 80 to which are connected opposing ends 82 and 84 of the hose 72 to tubular stubs 86 and 88 on the control boxes, as by suitable fittings. The inertance loop 70 thereby interconnects the first and second ports 50, 52 so that the ends of the hose are in fluid communication with the high velocity air flow 46 at opposite sides of the path of the air passing through the power nozzle 44.

The converging inlet chamber walls and the diverging walls of the outlet chamber, and the relationship and relative dimensions of the power nozzle, the inertance loop and the setback, interact to cause the high velocity stream 46 to oscillate between the side walls 60 and 62 as it exits the fluidic device through the outlet chamber 14. This oscillation is a result of a periodic interruption of the attachment of the high velocity air flow in the outlet chamber, which is due to the "Coanda" effect. As the high velocity air stream 46 passes through the power nozzle 44 and expands into the setback region 48, low pressure regions are formed at the control ports that tend to draw air from the inertance loop through the ports, due to the Venturi effect of the air flow over the control port openings. As a result, a low pressure "attachment bubble" forms at one or the other of ports 74 and 76, for example port 74. This causes air to tend to flow from the loop into the main air flow to form a bubble, which tends to move up the corresponding adjacent outlet chamber wall, for example wall 60, distally from or above the port where the bubble has formed. This causes the air stream 46 to detach from that wall above the setback region and to attach to the opposite wall, for example wall 62. When this occurs, the high velocity air flow expanding past the proximate control port 76 in the inertance loop causes a low pressure attachment bubble to form on the opposite side, causing the high velocity air stream 46 (proximate that control port which is then closest to the momentarily attached flow) to detach from the wall 62 and to attach to the opposing wall 60, again by reason of the Coanda effect.

So long as there is adequate air flow into the inlet, this bi-stable, oscillating process continuously repeats itself at the opposed walls and control ports to produce a periodic side to side shift of flow out of the outlet chamber 14, as indicated by the sweeping air flow arrow 18. The period and frequency of this oscillation are controlled by the flows permitted by the setback width Ws with respect to the width Wp of the power nozzle, and by the angle of divergence of the side walls of the outlet chamber, and by the length and diameter of the inertance loop 70 interconnecting the control ports CP1 and CP2. With respect to the illustrated loop 70, the longer the length of the tubing 72 and/or the smaller its diameter, the more restrictive is the fluid communication between the control ports and thus the lower will be the frequency of oscillation.

As an example of the relative dimensions of an exemplary fluidic device configured in accordance with the present invention, a working model of the oscillator embodiment of FIGS. 1 and 2 was constructed with the following dimensions. The power nozzle 44 had a width Wp between walls 20 and 22 of 31 mm and a height (or depth Ds) between walls 24 and 26 of 41 mm. The setback width Ws was 1.2 times the width of the power nozzle, or 37.2 mm, while its height (depth Ds) was also 41 mm. The side walls 60 and 62 of the exit chamber 14 diverged 38° from a central axis 90 of the device 10, as indicated by angle 92 in FIG. 2, the control ports each had a width (diameter) of 9.5 mm, and the tubing 72 had an inner diameter of 15.9 mm and a length of 1.15 meters. The air flow into the device was a substantially straight and steady flow of about 265 cubic feet per minute ("cfm"). In tests of this device, it was found that the outlet air flow 18 swept back and forth across the outlet chamber 14 effectively and reliably.

In preferred forms of the oscillating fluidic device of the invention, the setback width is between 1.1 and 1.5 times the width of the power nozzle, and the divergence angle 92 of the outlet chamber walls is between 15° and 60°.

The outlet chamber 14 issues or projects the oscillating air flow 18 through a rectangular outlet aperture in the embodiments of FIGS. 1 and 2, but persons having skill in the art will recognize that the outlet aperture of outlet chamber 14 could easily be configured as an opening having another (e.g., oval, elliptical or elongated slot-shaped) cross section, in accordance with the present invention.

A modified form of the oscillating air flow attachment of FIGS. 1, 2 and 2A is illustrated at 100 in FIG. 3, wherein similar elements to those illustrated in FIGS. 1 and 2 are similarly numbered. As described above, the fluidic device 100 has an inlet chamber 12 and an outlet chamber 14. The inlet chamber of the fluidic device receives an inlet fluid flow 16 from a source (not shown) of air or fluid under pressure and produces from the outlet chamber a varying outlet flow 18. In this embodiment, the inlet chamber is illustrated as being connected to a source of fluid under pressure supplied through a tubular supply conduit 102 by way of a fitting 104 that connects the conduit 102 to the rectangular inlet chamber 12. It will be understood that the fluidic devices of both this embodiment and the embodiment of FIGS. 1, 2 and 2A, as well as the additional embodiments to be described below, can be adapted to receive fluids, such as air under pressure, through a variety of inlet conduits of various cross-sectional sizes and shapes by appropriately shaping the inlet chamber or by the use of suitable adapters. In a preferred form of the invention, for example, the fluidic device of the invention is connected to the outlet of a conventional leaf blower which may have a duct or conduit having an oval, elliptical or elongated slot-shaped cross section.

As illustrated in FIG. 3, in this embodiment of the invention the first and second control ports, CP1 and CP2, are located on the opposed side walls 20 and 22 of the inlet chamber, above (downstream of) but adjacent to the power nozzle aperture and below the setback region of the device as previously described. The control ports include the control chambers 78 and 80 located on walls 20 and 22, respectively, which are open to the interior of the fluidic device so the control chamber is in fluid communication with the high velocity air 46 that passes through the power nozzle 44. The control chambers may be rectangular boxes, as illustrated, with inner wall areas open to the airway through the fluidic device 100, and extending substantially entirely across the depth of the interior lumen of the device just above the region 44, as illustrated at 76 in FIG. 2A. Connected to outer walls of chambers 78 and 80 are corresponding tubular stubs 86 and 88, to which are connected respective ends 82 and 84 of the inertance loop 72, as by suitable fittings 118 and 120, respectively. As here illustrated, the tubular stubs are connected on ends of the respective chambers, instead of on the side walls as illustrated in FIG. 2, but are still in fluid communication with the interior of the nozzle assembly 100. Again, the inertance loop can be a piece of hose such as curled or flexible tubing or the like, linking CP1 and CP2 so that the loop is in fluid communication with the high velocity air flow 46 at opposite sides of the lumen where the air passes through the power nozzle.

Figure 4:
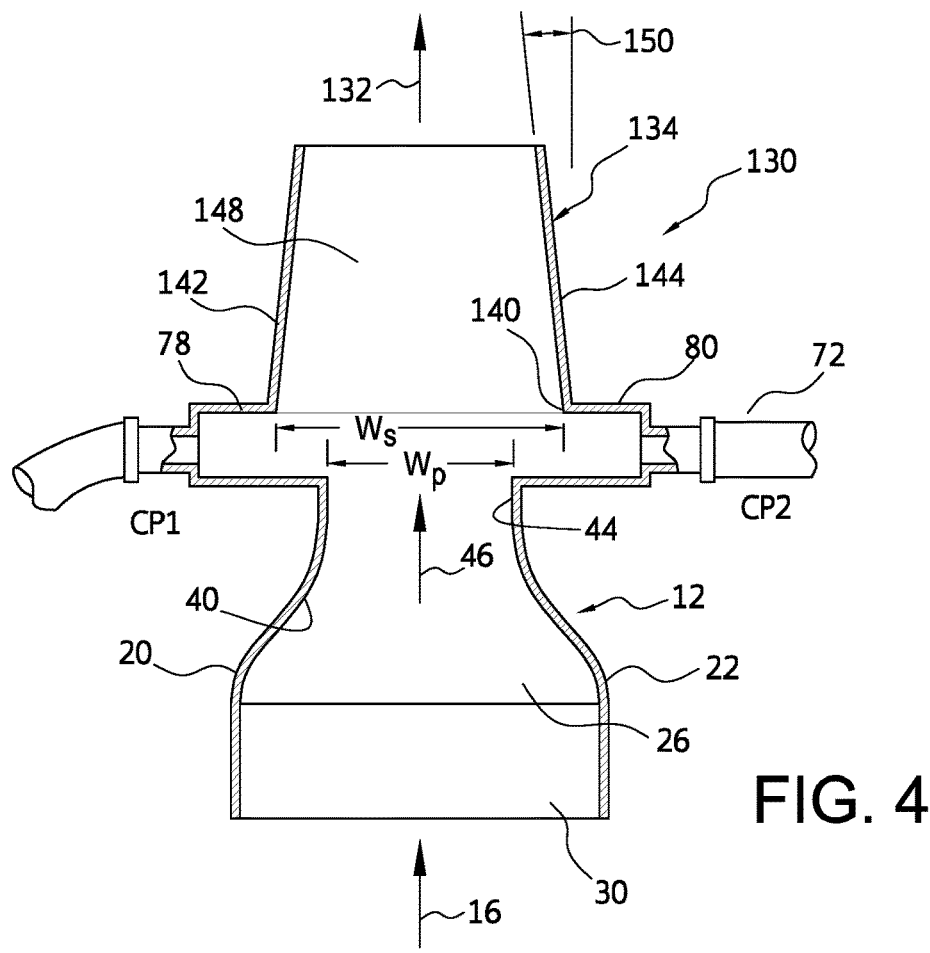
FIG. 4 is a cross-sectional view illustrating a second embodiment of the present invention, wherein a pulsating air flow is produced.

In another embodiment of the present invention, illustrated in cross-section in FIG. 4 (and partial cut-away perspective in FIG. 4A), where elements common to the embodiment of FIGS. 1 and 2 are similarly numbered, a fluidic device 130 is constructed to provide a variable outlet fluid flow 132 which is a substantially straight-line flow that pulsates rather than sweeps, as in the previously-described embodiments. In this pulsating embodiment, the inlet chamber 12 of the fluidic device is part of a lumen which receives an inlet air flow 16 from a source (not shown) of fluid under pressure and produces from an outlet chamber 134 the varying outlet flow 132. As before, this varying flow is achieved in a device having no moving parts and no external power supply, with the varying flow being produced by the fluidic geometry solely from energy in the inlet fluid stream. The device works with both water and air, or in general with both liquids and gases, but will be described herein as air or gas flow device for convenience and clarity. Again, the preferred application is as an attachment to a pressurized air flow source such as a conventional leaf blower, although it will be understood that other sources of air under pressure may also be used to provide the described inlet and outlet air flow.

As illustrated, the inlet chamber 12 may be generally rectangular in cross-section, as viewed from the direction of the inflowing air 16, although other (e.g., oval, elliptical or elongated slot-shaped cross section) shapes suitable for attaching the device 130 to different sources of air may be provided. In the illustrated embodiment, the inlet chamber is formed with opposed sidewalls 20 and 22 and with front and rear walls 24 and 26, and has a lower flange region 30 for use in connecting the inlet chamber to an air source such as a blower, pump, compressor, or the like, as by way of a suitable hose, connector fitting, or other conduit. In a preferred form of the invention, the air source is a conventional leaf blower having a forwardly-extending nozzle to which the fluidic device of the invention is attached. The walls of the inlet chamber 12 are shaped to form a converging nozzle, with the inner surfaces 40 of the walls forming a lumen having a smooth sinusoidal profile extending from the entry 42 upwardly and inwardly to a power nozzle aperture 44, which is the smallest cross-sectional area of the converging nozzle and which has a width Wp. The converging profile of the input lumen 40 produces a high velocity stream of air 46, with minimal pressure drop.

Figure 4A:
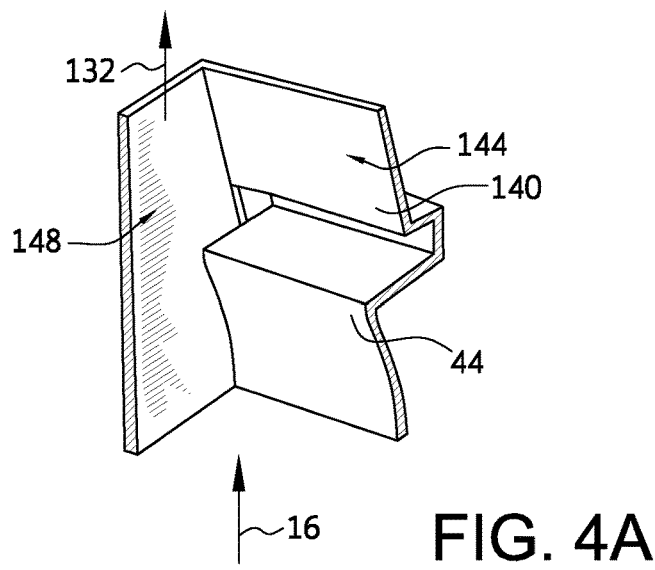
FIG. 4A is a partial (cut-away) perspective view of the interior of the apparatus of FIG. 4.

Downstream of the region of the power nozzle aperture 44, distally, in the direction of air flow 46, the inlet chamber diverges so that the cross-sectional area of the fluidic device 130 expands to form a setback region 140 at the entrance to the outlet chamber 134. The outlet chamber may be rectangular in cross-section, with side walls 142 and 144, front wall 146 (not shown), and rear wall 148. The setback 140 has an area (or a width Ws between side walls 142 and 144 as viewed in FIG. 4) that is greater than the area (or width Wp between side walls 20 and 22) of the power nozzle 44. As illustrated, the opposite walls 20 and 22 of the inlet chamber expand outwardly to the desired width of the setback 140. From the setback region upwardly (downstream), the sidewalls 142 and 144, are parallel to each other or slightly converging (0°-15°), as indicated by angle 150 (as differentiated from the oscillating mode of the invention where the walls are diverging at 15°-60° deg). In this embodiment the front wall (not shown) and the rear wall 148, illustrated in FIG. 4A, are substantially parallel to each other, although they could also be converging. In the pulsating mode of this embodiment, the stream attaches to opposed sidewalls 142 and 144 alternately due to the formation of large "attachment bubbles", as described above with respect to the oscillating mode. Due to the converging or substantially parallel walls, however, the sweeping motion is eliminated and the resulting output air flow 132 is a straight pulsating jet (no sweep) with a pulse frequency determined by the relative setback width Ws with respect to the width Wp of the power nozzle, the length and diameter of the inertance loop, and length of the outlet sidewalls.

In a preferred form of the pulsating device, the power nozzle had a width (Wp) of 31 mm and a depth of 41 mm, while the setback had a width (Ws) of 62 mm (twice the power nozzle width) and a depth of 41 mm. The outlet walls had converging angles of 10°, and the control ports had a width of 9.5 mm. The width of the outlet chamber at its outlet top edge was 55 mm and its depth was 41 mm. The inner diameter of the tubing 72 was 9.5 mm and its length was 0.39 meter. The air flow through the device was about 265 cfm, and the pulsating frequency was about 19 Hz (or in the range of 18-20 Hz), and that pulsating frequency rate was found to be effective for clearing debris (providing good "punch") and comfortable for users who typically hold a leaf blower (such as that shown in FIG. 7) in one hand during use.

Figure 5:
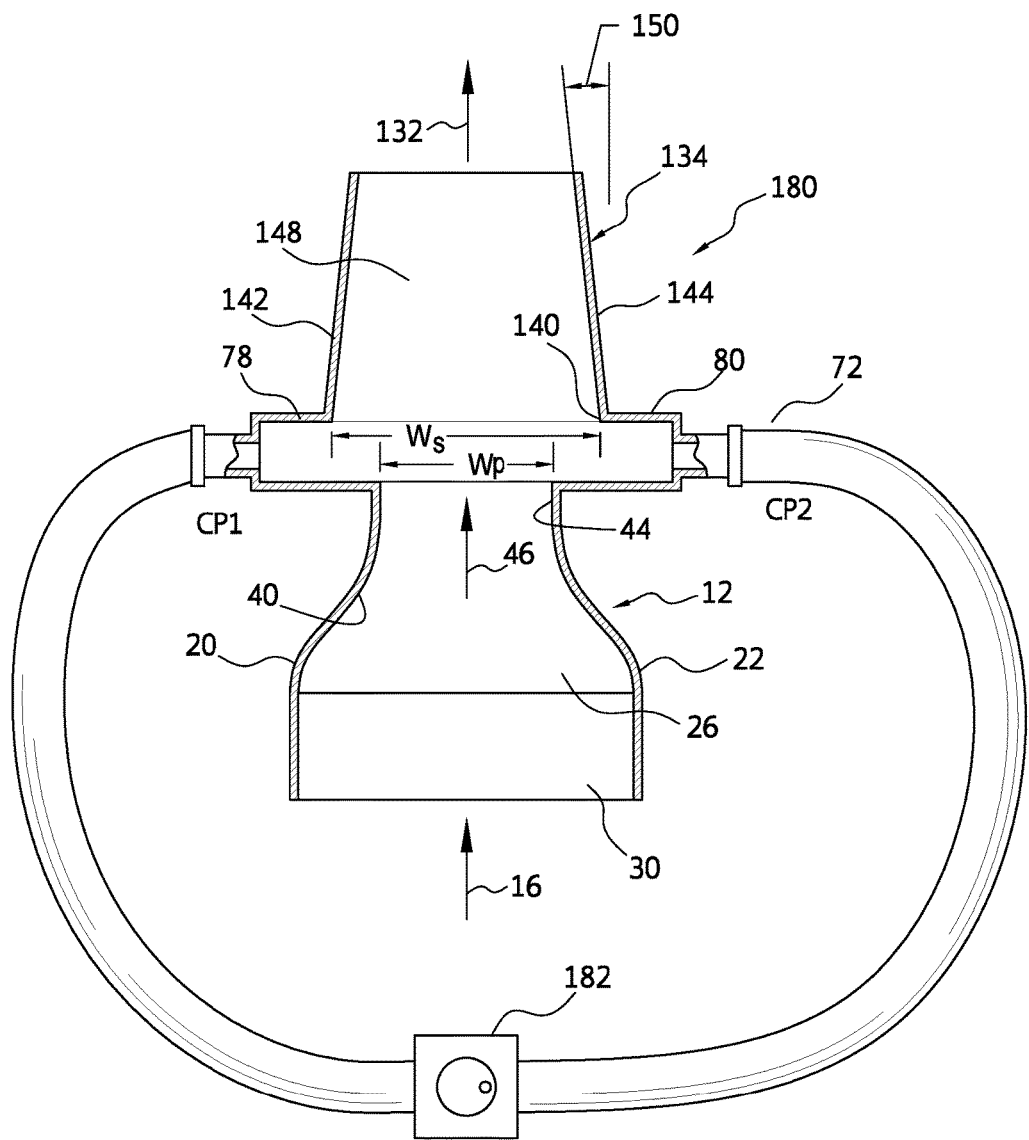
FIG. 5 is a view of a modified form of the device of FIG. 4, illustrating a mode-selection switch or control configured to enable the user to switch the nozzle apparatus from an oscillating mode (generating the sweeping motion or the pulsing motion) to a non-oscillating mode (generating a straight steady stream) in accordance with the present invention.

In accordance with another aspect of the invention, illustrated at 180 in FIG. 5, either the oscillating or the pulsating mode of the fluidic device may be switched off by means of a mode selection or bypass switch 182 which is preferably positioned symmetrically between ports CP1 and CP2 in the tubing 72 to selectively open the inertance loop 70 to atmosphere, and thus prevent the high velocity air flow 46 from switching back and forth between the outlet chamber walls, thereby converting the device output to a straight, non-varying output air flow or straight and steady flow mode. For convenience, FIG. 5 illustrates the bypass switch 182 in the inertance loop for the pulsating embodiment illustrated in FIG. 4, but the mode selection modification illustrated in FIG. 5 may be equally well be incorporated into loop 70 of the oscillating or sweeping devices of FIGS. 1-3. Switch 182 may simply be an openable port in the loop 70, and thus may be a hinged or slidable door, or any suitable manipulable or remotely controllable (e.g., solenoid actuated) valve that can be closed (to form a continuous sealed or closed inertance loop) or opened (e.g., to the atmosphere). Alternatively, the control ports can be opened to atmosphere simply by removing the tube 72. When open to atmosphere, fluid is simply entrained by the high velocity flow 46 at both of the control ports, leading to no flow attachment to the outlet walls and a straight jet. The oscillating and the pulsating embodiments may be constructed with or without this switch mode.

FIG. 6 illustrates at 190 a perspective view of the device of FIG. 4, with the inertance loop 70 connected to the control chambers 78 and 80 as previously described. In this illustration, elements similar to those of FIG. 4 are similarly numbered. Fluidic device 190 is a pulsating embodiment, having the large divergence from its power nozzle portion to its setback described with respect to FIG. 4, and having the converging wall output chamber 134 that produces a straight, pulsing output air flow 132. In this embodiment, the device 190 incorporates rectangular, box-like control chambers that are similar to the 78 and 80 of prior Figures, but loop 70 in this embodiment is illustrated as being connected for fluid communication with the interior air flow 46 by suitable fittings 196 and 198 secured to end walls 200 and 202 of the chambers 78 and 80, respectively. Again, this loop may incorporate the switch 182 illustrated in FIG. 5, if desired.

The outlet chamber 134 issues or projects the pulsing air flow 132 through a rectangular outlet aperture in the embodiments of FIGS. 4-6, but persons having skill in the art will recognize that the outlet aperture of outlet chamber 134 could easily be configured as an opening having another (e.g., oval, elliptical or elongated slot-shaped) cross section, in accordance with the present invention.

Figure 7:
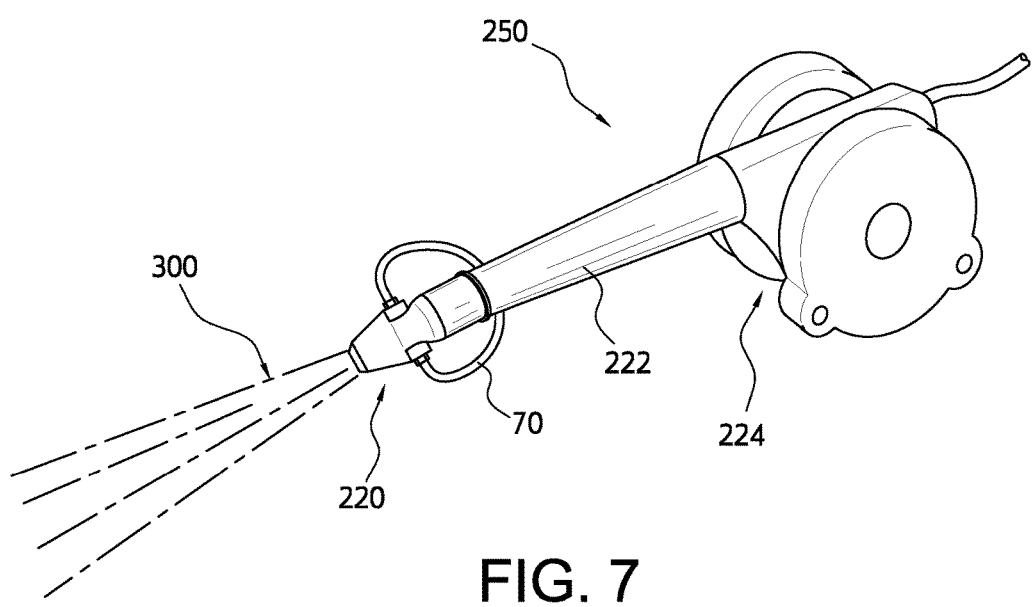
FIG. 7 is a diagrammatic perspective view illustrating the apparatus of the present invention configured for connection to a leaf blower.

As illustrated in FIG. 7, either an oscillatory (sweeping) motion or a pulsating of the outlet air flow 300 from a conventional leaf blower 224 can be obtained when a fluidic device 220, such as any one of the nozzle assemblies described hereinabove with respect to FIGS. 1-6 is connected to an outlet nozzle 222 of a conventional leaf blower 224, either as a removable attachment or as a permanent part of the leaf blower's outlet duct or nozzle 222. Optionally, fluidic device 220 is configured with a bypass or mode selection switch 182 (not shown) to provide a selectable "normal" mode, or operation (i.e. straight steady stream). The frequency of the oscillatory or the pulsating motion is preferably in the range of 5-50 Hz. There are many advantages for oscillatory motion that include clearing a wider region with minimal hand effort. Pulsatile motion in pulsing air flow 300 offers increased "punch" to clear leaves or other debris from a surface to be cleaned.

Persons of skill in the art will appreciate that in broad terms, the embodiment of FIG. 7 illustrates a transportable instrument or assembly 250 configured with a fluidic apparatus 220 for generating pulsed air flow 300 or oscillating air flow 18 for surface cleaning or sweeping to remove leaves or other debris from that surface (not shown). In accordance with the present invention, fluidic apparatus is configured for generating a variable periodic flow of pressurized fluid from a supplied stream of pressurized fluid generated by a portable pressurized fluid source or blower 224, and fluidic 220 comprises a nozzle assembly (e.g., 10, 100 or 190) defining an internal lumen with an inlet segment configured to receive the pressurized fluid flow from the source where the inlet segment's converging profile terminates distally or downstream in a power nozzle segment defining a power nozzle aperture having opposing sides separated by a selected width and configured to generate a high velocity fluid stream with minimal pressure drop. More generally, the power nozzle aperture has a power nozzle aperture cross sectional area which is significantly smaller than the inlet aperture's cross sectional area. Fluidic 220 also has a first control port and a second control port in fluid communication with the internal lumen downstream of and on opposing sides of the power nozzle segment and an inertance loop interconnecting and providing fluid communication between the first control port and said second control port; as with the embodiments described above, a setback region is downstream of the opposing control ports, and that setback region defines a setback aperture with a selected cross sectional area or width which is greater than the power nozzle aperture cross sectional area or width, and the length and cross sectional area of the inertance loop defines an inertance loop fluid flow resistance (providing a selected impedance for the flow of air passing therethrough) which (along with the relative widths or aperture cross sectional areas of the setback aperture and power nozzle aperture) determine a frequency of oscillation (sweeps or pulses) in the distally projected outlet flow 300.

Having described preferred embodiments of a new and improved apparatus and method, it is believed that other modifications, variations and changes will be suggested to those skilled in the art in view of the teachings set forth herein. It is therefore to be understood that all such variations, modifications and changes are believed to fall within the scope of the present invention as set forth in the appended claims.

We claim:

1. A method for generating a variable flow of a pressurized fluid, comprising the steps of:
   (a) supplying a fluid under pressure to a fluidic device having an inlet segment, a power nozzle segment and an outlet segment for producing a controlled, varying, high pressure exhaust flow pattern at an outlet end;
   (b) configuring outlet segment walls to have a selected wall angle of between −15° and +60° with respect to a central axis for producing a selected outlet oscillating or pulsating flow pattern;
   (c) providing an internal lumen in said inlet segment having a tapered profile leading to said power nozzle segment;
   (d) providing a power nozzle aperture that is defined by the smallest cross-sectional area within the lumen of said power nozzle segment;
   (e) providing in the fluidic device, at a location adjacent but downstream of the power nozzle aperture, opposed first and second control ports in fluid communication with the air passing through the lumen and with one another by way of an external inertance loop;
   (f) expanding the fluid flow from the power nozzle aperture into a setback region immediately downstream of the control ports and leading to the outlet lumen, whereby supplying inlet air under pressure to the inlet end of the fluidic nozzle generates a high velocity outlet stream with minimal pressure drop, with the inertance loop and the setback region causing the outlet stream to vary periodically; and
   (g) opening said inertance loop to atmosphere to disable variations in the outlet flow pattern to produce a "normal" or straight-line flow.

2. A method for generating a variable flow of a pressurized fluid, comprising the steps of:
   (a) supplying a fluid under pressure to a fluidic device having an inlet segment, a power nozzle segment and an outlet segment for producing a controlled, varying, high pressure exhaust flow pattern at an outlet end;
   (b) providing an internal lumen in said inlet segment having a tapered profile leading to said power nozzle segment;
   (c) providing a power nozzle aperture that is defined by the smallest cross-sectional area within the lumen of said power nozzle segment;
   (d) providing in the fluidic device, at a location adjacent but downstream of the power nozzle aperture, opposed first and second control ports in fluid communication with the air passing through the lumen and with one another by way of an external inertance loop; and
   (e) opening said inertance loop to atmosphere to disable variations in the outlet flow pattern to produce a "normal" or straight-line flow.

3. The method of claim 2, further comprising expanding the fluid flow from the power nozzle aperture into a setback region immediately downstream of the control ports and leading to the outlet lumen, whereby supplying inlet air under pressure to the inlet end of the fluidic nozzle generates a high velocity outlet stream with minimal pressure drop, with the inertance loop and the setback region causing the outlet stream to vary periodically.

4. The method of claim 2, further comprising configuring outlet segment walls to have a selected wall angle of between −15° and +60° with respect to a central axis for producing a selected outlet oscillating or pulsating flow pattern.

* * * * *